UNITED STATES PATENT OFFICE.

OTTO NYDEGGER, OF UERDINGEN, GERMANY, ASSIGNOR TO THE FIRM OF R. WEDE-KIND & CO. M. B. H., OF UERDINGEN, GERMANY.

PROCESS OF MAKING PURE AMMONIUM NITRATE.

986,204.

Specification of Letters Patent. Patented Mar. 7, 1911.

No Drawing. Application filed February 19, 1910. Serial No. 544,801.

*To all whom it may concern:*

Be it known that I, OTTO NYDEGGER, a citizen of the Swiss Republic, and residing at Uerdingen-on-the-Rhine, Germany, have invented a certain new and useful Process for the Preparation of Pure Ammonium Nitrate from Ammonium Sulfate and Calcium Nitrate Containing Magnesium, of which the following is a specification.

Technically pure ammonium-nitrate has heretofore been obtained by the neutralization of nitric acid with ammonia; recently also by the double decomposition of sodium-nitrate and ammonium-sulfate as set forth in the specification of U. S. Patent 864,513.

Since calcium-nitrate is produced on a large scale by means of electricity, this likewise affords a readily available material for the production of ammonuium-nitrate. The decomposition of calcium-nitrate by ammonium-sulfate in aqueous solution takes place according to the equation:

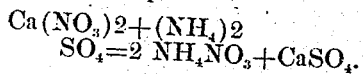

When working with dilute solutions, the gypsum formed separates out for the greater part; the small portion remaining in solution is precipitated by concentrating the dilute ammonium-nitrate solution, with the exception of a very small trace, corresponding to its solubility in solutions of ammonium-nitrate. The solution after being separated from the gypsum and after being sufficiently concentrated crystallizes only ammonium-nitrate upon cooling, since the gypsum, being more soluble in the cold, remains in solution. Starting from pure calcium-nitrate a very pure ammonium-nitrate is therefore obtained in this way. The commercial calcium-nitrate however always contains, besides alumina and iron-oxid, considerable quantities of magnesia and magnesium-nitrate as impurities. The magnesium compounds are dissolved during the double decomposition and are not removed by concentration. If operating with equivalent quantities of the two salts or with an excess of sulfate of ammonia, they are upon cooling the concentrated solution, precipitated for the greater part simultaneously with the ammonium-nitrate with the result that the incombustible residue in the ammonium-nitrate is increased to such a degree that the latter cannot be used for the production of safety-explosives.

The object of the present invention is to overcome this trouble, by preventing the simultaneous crystallization of the magnesium-sulfate with the ammonium-nitrate, and, also permitting the separate recovery of the magnesium-sulfate in a very simple manner. For this purpose I proceed in such a way that the solution obtained by the double decomposition of calcium-nitrate and ammonium-sulfate contains, while being evaporated up to the concentration necessary for the crystallization of the ammonium-nitrate, an excess of calcium-nitrate of preferably 1 to 10% or thereabout over the quantity theoretically required. In place of the calcium-nitrate, strontium or barium-nitrate may also be employed. In either case the magnesium salts remain completely in solution during the concentration of the lye as well as during the cooling necessary for the crystallization of the ammonium-nitrate. Even when the magnesium salts are present in the mother-lye in relatively large quantities, (for example 10 parts MgO and even more to 100 parts NH$_4$NO$_3$) the ammonium-nitrate crystallized therefrom can be obtained free from even a trace of magnesium compounds. Inasmuch as the mother-lye of the ammonium-nitrate crystallization is again added to a further quantity of equivalent parts of the calcium-nitrate and ammonium-sulfate before concentration, the excess of calcium-nitrate once added either before decomposition, or during concentration, is sufficient for enabling the process to be repeated until the mother-lye has to be removed for the separation of the magnesium-salts which will now be described. Whenever the magnesium salts in the mother-lye have been sufficiently enriched, sufficient ammonium-sulfate is added to convert not only the dissolved calcium and magnesium salts into their sulfates, but that also an excess of ammonium-sulfate (preferably from 1 to 10% of the ammonium-nitrate present) is contained in the solution. The magnesium-sulfate or its double salt with ammonium-sulfate thus formed is for the most part crystallized out from the hot solution and practically completely removed upon cooling the same. Such sulfate is separated from the solution and washed.

The purified solution after the addition of the requisite excess of nitrate of calcium, or of another alkaline earth is returned to the concentrating vessel.

In order to avoid the evaporation of large quantities of water the solutions of the salts are preferably kept near to their point of saturation. In operating under the process, the water resulting from leaching the gypsum is used instead of fresh water for dissolving the two salts. The process can of course also be effected by adding one of the salts in the solid state to the solution of the other salt.

As an example of carrying out the invention, the following proportions give satisfactory results: 100 parts of calcium-nitrate containing 75% $Ca(NO_3)_2$ dissolved in 20 parts of hot water are added to the hot solution of 60 parts of sulfate of ammonia containing 25% $NH_3$ in 70 parts of water. After removing the gypsum the solution is concentrated till it contains only 13 parts of water. After removing the hot solution from the gypsum precipitated during concentration, the former is cooled to 20–10° C. About 50 parts of nitrate of ammonia crystallize out and about 20 parts remain in the mother-lye. To the latter are then added 5 parts of sulfate of ammonia, and after separating from the precipitated gypsum and double salt of magnesium-sulfate with sulfate of ammonia the solution is used again in the process.

I claim as my invention:

1. The process of manufacturing pure ammonium-nitrate from ammonium-sulfate and alkaline earth nitrate containing magnesium, which consists in effecting double decomposition in the presence of an excess of the nitrate employed, removing the sulfate formed from the solution and then separating the ammonium-nitrate by crystallization, whereby said ammonium-nitrate is obtained free from magnesium, substantially as described.

2. A process of manufacturing pure ammonium-nitrate from solutions of ammonium-sulfate and alkaline earth nitrate containing magnesium, which consists in adding the nitrate in excess to the solution, removing the sulfate formed from the solution, crystallizing out the ammonium-nitrate, thereafter removing the magnesium from the mother-lye by adding ammonium-sulfate in more than sufficient quantity to convert the magnesium salts as well as the alkaline earth salts into their sulfates or into double sulfates and crystallizing out the same, substantially as described.

3. The process of manufacturing pure ammonium-nitrate from ammonium-sulfate and alkaline earth nitrate containing magnesium, which consists in effecting double decomposition in the presence of an excess of the nitrate employed, removing the sulfate formed from the solution, and then separating the ammonium-nitrate by crystallization whereby said ammonium-nitrate is obtained free from magnesium, purifying the solution from the magnesium salts by adding an excess of ammonium-sulfate, crystallizing out and removing the magnesium salt and adding an excess of the alkaline earth nitrate to the purified solution whereby the latter may be again employed for the production of ammonium-nitrate, as described.

4. A process of manufacturing pure ammonium-nitrate from solutions of ammonium-sulfate and alkaline earth nitrate containing magnesium, which consists in adding the nitrate in excess to the solution, crystallizing out the ammonium-nitrate after removing the sulfate formed from the solution, repeating the process until the magnesium salts are present in such quantity that pure ammonium-nitrate cannot be crystallized out, and then purifying the mother-lye by adding ammonium-sulfate in more than sufficient quantity to convert the magnesium salts as well as the alkaline earth salts into their sulfates or into double sulfates and crystallizing out the same, substantially as described.

5. In the process of obtaining pure ammonium-nitrate from a solution of ammonium-nitrate containing magnesium, the addition of an excess of alkaline earth nitrate to the solution before crystallization of the ammonium-nitrate, whereby the magnesium salts present as impurities are retained in solution, while the ammonium-nitrate crystallizes out, substantially as described.

In testimony whereof I have signed my name to this specification, in the presence of two subscribing witnesses.

OTTO NYDEGGER.

Witnesses:
H. CUADPLIEG,
ELISE KOHBUNH.